(12) United States Patent
Liu

(10) Patent No.: US 6,757,257 B1
(45) Date of Patent: Jun. 29, 2004

(54) TRAFFIC BASED DIMENSIONING METHOD FOR DETERMINING THE THROUGHPUT OF AN EDGE ROUTER IN A DATA NETWORK

(75) Inventor: Ge Liu, Richardson, TX (US)

(73) Assignee: Ericsson Inc., Plano, TX (US)

(*) Notice: Subject to any disclaimer, the term of this patent is extended or adjusted under 35 U.S.C. 154(b) by 0 days.

(21) Appl. No.: 09/560,278

(22) Filed: Apr. 26, 2000

(51) Int. Cl.[7] .............................................. G01R 31/08
(52) U.S. Cl. ........................ 370/253; 370/229; 455/450
(58) Field of Search ................................ 370/232, 233, 370/234, 235, 252, 253, 400, 401, 465, 902, 229; 455/450

(56) References Cited

U.S. PATENT DOCUMENTS 6,266,322 B1 * 7/2001 Berger et al. ............... 370/229
6,282,424 B1 * 8/2001 Wright et al. ............... 455/450

OTHER PUBLICATIONS

Requirements, Planning and Choosing Technology, *Traffic Analysis and Capacity Planning*, Chapter 16, pp. 509–538.
G. Sundstrom, et al., *First results from LAN Traffic measurements at UAB—A comparison between ideal and real traffic*.
Nail Adar, et al., *Telepack: An Advanced Teletraffic Analysis Package*, IEEE Communication Magazine, Aug. 1998, pp. 84–87.
Ronald G. Addie et al., *Broadband Traffic Modeling: Simple Solutions to Hard Problems*, IEEE Communications Magazine, Aug. 1988, pp. 88–95.

* cited by examiner

*Primary Examiner*—Douglas Olms
*Assistant Examiner*—Robert W Wilson

(57) ABSTRACT

An algorithm, (126), method, and system (120) for accurately dimensioning an edge router (104) servicing subscribers at terminals (110) of a data network (100) based on network parameters and the required grade of service (GoS). The throughput capacity (C) required for the edge router (104) is determined using calculations dependant on the number of subscriber data transfer requests. The router dimensioning system (120) comprises a computation module (124) coupled to a user interface module (122) and a display module (128). Input network parameters include the number of subscribers (S), the average number of file transfer requests per subscriber in a peak; time,period (M), access line speed (A), average file size (F), average packet size (P), and the Probability of Overloading ($\alpha$ or GoS). The dimensioning system (120) determines the required throughput capacity (C) of the edge router (104) in terms of packets per second.

12 Claims, 2 Drawing Sheets

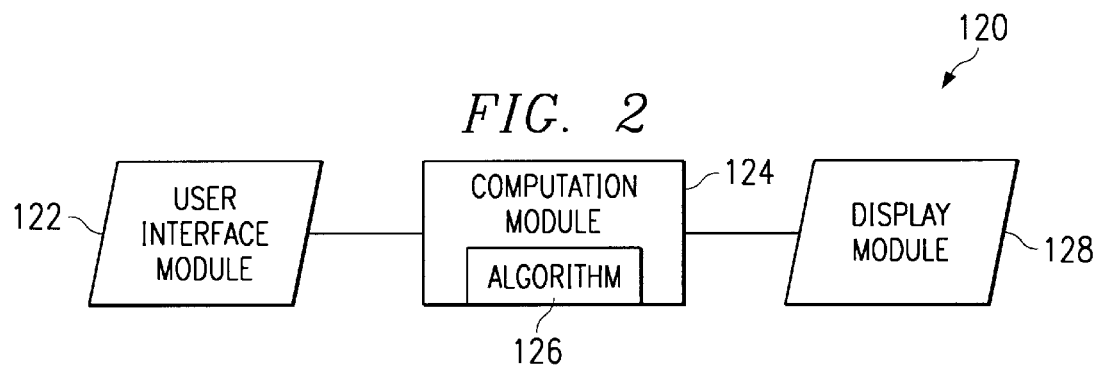
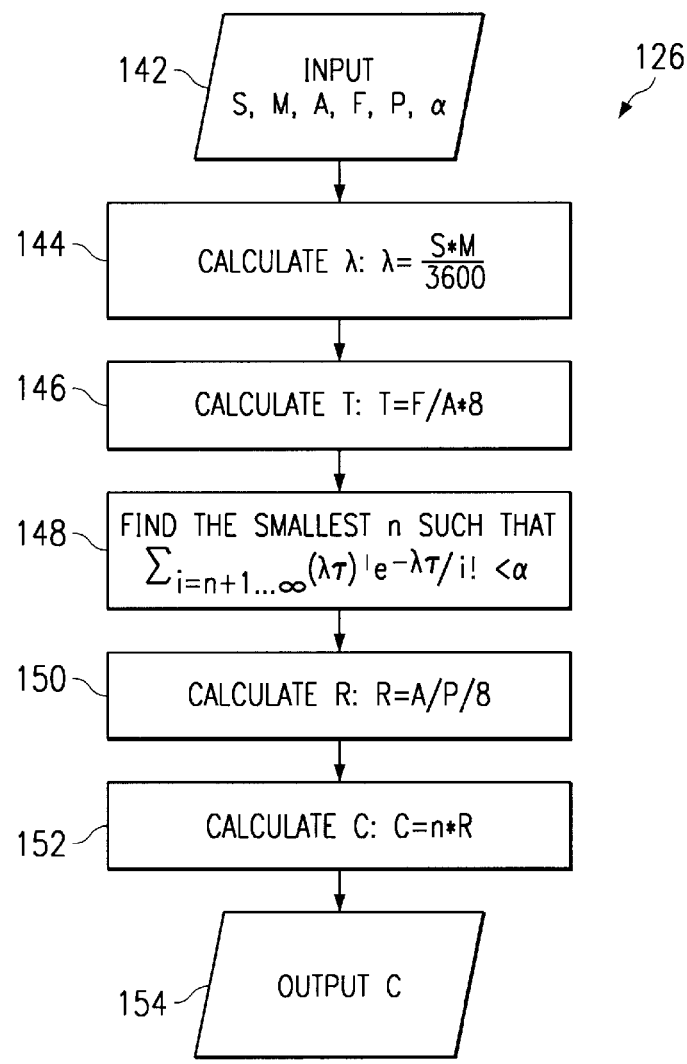

TRAFFIC BASED DIMENSIONING METHOD FOR DETERMINING THE THROUGHPUT OF AN EDGE ROUTER IN A DATA NETWORK

TECHNICAL FIELD

This invention relates generally to communication systems, and more particularly to data network design.

BACKGROUND OF THE INVENTION

The Internet has become a popular tool for sending and receiving information. In essence, the Internet comprises a worldwide network of communications equipment and service providers that use a common protocol for communicating. Data is transmitted from one user to another over a vast infrastructure of routers, servers, gateways and other similar devices. Typically, users on either end of the network operate computers equipped with appropriate software, devices and other components. Examples of such components include a modem and Internet browser application. Often, a user establishes a connection to the Internet through an Internet Service Provider (ISP). The underlying link level protocols stacks handle the messaging functions on both ends of the channel.

Typically, data is transmitted from a host through a router connected to an Internet Protocol (IP) network through a series of network links and switches to a receiving host. Packet-switched networks, in which messages from the transmitting host are divided into packets that are transmitted through the IP network and reassembled at the receiving host, are commonly used for the transport of digital data.

A challenge in designing a data network is determining the size and capacity of an edge router that will serve as a gateway to the IP backbone network for several terminals. An edge router requires sufficient capacity to handle data traffic to and from the IP network for the serviced terminals. In the past, the modeling of data traffic was often based on the packet arrival process, which was assumed to follow a Poisson or Erlang process. However, these modeling techniques have proven inadequate for broadband traffic analysis.

Capacity and performance of the traffic process for a router is often analyzed using a modeling formula called the M/G/1 model, used for modeling packet, frame and cell networks. However, basing an estimation of router throughput on the traditional M/G/1 model can lead to severely under-dimensioning a router. An under-dimensioned router lacks sufficient capacity to handle data traffic for its users, and may become congested due to excessive traffic entering the router for its capacity. Uncontrolled congestion can lead to data loss, long delays, and retransmissions. Traffic measurements made on real data networks have shown that the M/G/1 model is inaccurate for packet arrival processing in a data network, especially in a Local Area. Network (LAN) environment.

Due to the complexity and the highly bursty nature of the packet arrival process of data traffic, determining the required edge router throughput or capacity for data traffic is particularly difficult. Because no accurate model exists, routers are often chosen based on mere estimates of capacity requirements by counting the number of interfaces, for example, resulting in over-dimensioning the router. This results in larger routers being purchased than are necessary, creating increased costs and unused bandwidth.

What is needed in the art is a method of accurately determining the required throughput of an edge router in a data network.

SUMMARY OF THE INVENTION

The present invention achieves technical advantages as an algorithm, method, and system for dimensioning an edge router of a data network based on network parameters and the required grade of service (GoS). The throughput capacity required for the edge router is determined using calculations dependant on the number of subscriber requests rather than on the number of arriving packets, as in the prior art.

Advantages of the invention include accurate dimensioning of an access node such as an edge router in a data network, resulting in a cost savings in the purchase price of the router. A router is selectable that is capable of handling the data traffic for the subscribers or users of the data network terminals serviced by the edge router, with fewer occurrences of data loss, delays and retransmissions in the data network. The present invention provides an assessment of the performance and quality of service for a dimensioned router. The user-friendly invention is implemented based on network parameters input by the network designer.

BRIEF DESCRIPTION OF THE DRAWINGS

The above features of the present invention will be more clearly understood from consideration of the following descriptions in connection with accompanying drawings in which:

FIG. 2 shows a block diagram of the router dimensioning system of the present invention having a user interface module, a computation module and a display module; and FIG. 3 is a flow chart of the algorithm of the present invention.

Corresponding numerals and symbols in the different figures refer to corresponding parts unless otherwise indicated.

DETAILED DESCRIPTION OF PREFERRED EMBODIMENTS

Figure 1:
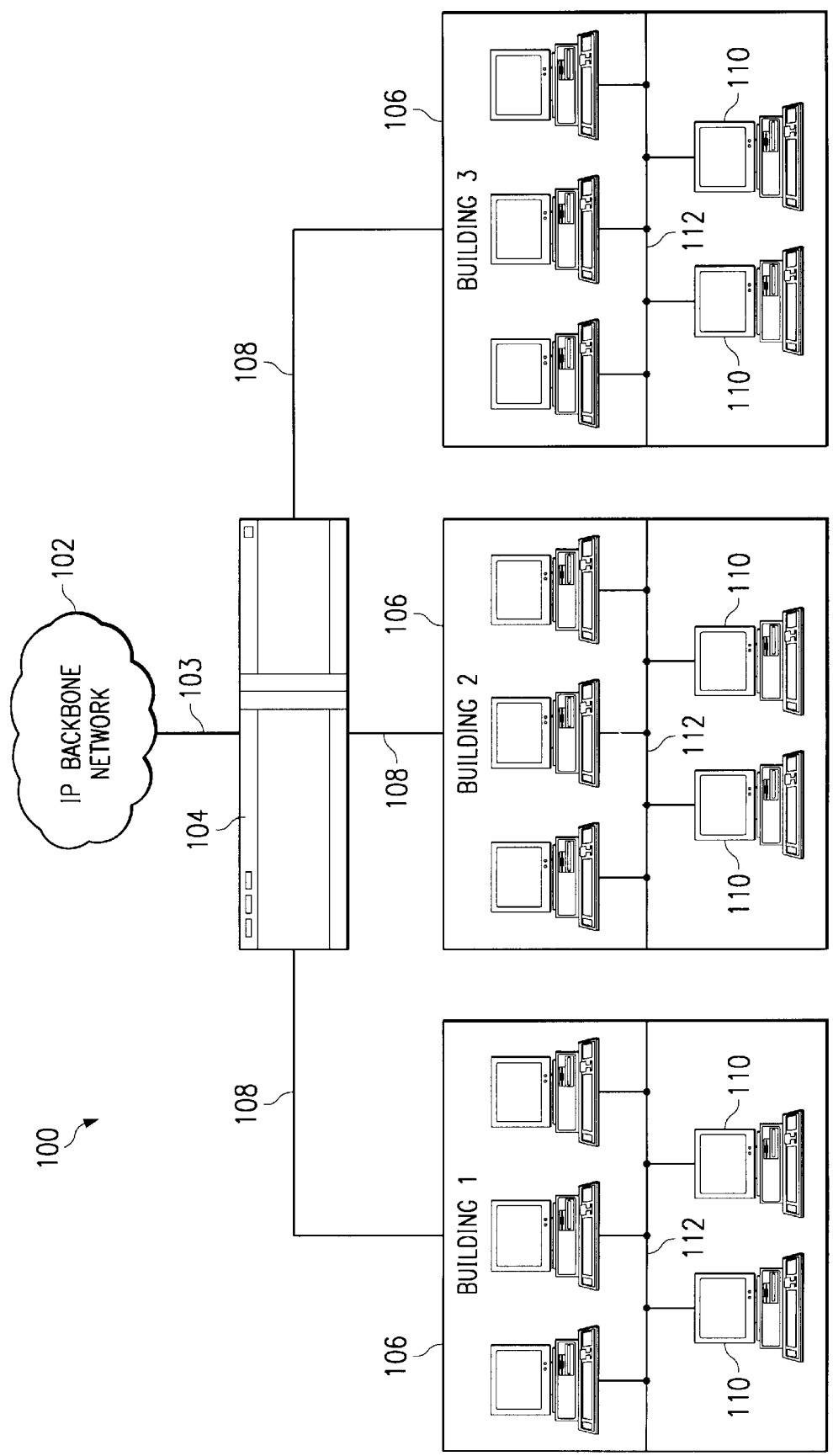
FIG. 1 illustrates a data network diagram having an IP backbone network coupled via an access node such as an edge router to a plurality of subscriber terminals.

FIG. 1 illustrates a data network 100 in accordance with the present invention comprising a IP backbone network 102 and a plurality of buildings 106 which may house commercial or military organizations, such as a business enterprise, for example. Each building has a plurality of subscribers or users using terminals 110 to access the IP network 102. The IP network 102 may comprise a plurality of backbone routers and/or ATM switch networks, for example. Terminals 110 may be networked together to form a LAN via a lower link Ethernet connection 112 operating at 10 Mbps, for example. An access node 104 such as an edge router is used to couple the terminals 110 of the various buildings 106 to the IP backbone network 102 via interfaces 103 and 108 adapted for data traffic. For example, interface 103 may comprise a TCP/IP link running on a T1, T3 or OC3 line. Interface 108 preferably comprises an upper link connection comprising cable or fiber, typically capable of operating at a higher capacity than the lower Ethernet link, such as 100 Mbps.

A challenging data network design issue is determining the capacity in terms of throughput, typically expressed in packets per second (pps), for the edge router 104. The present invention comprises a method, algorithm and system for accurately dimensioning the throughput of the edge router 104 of the data network 100 based on network 100 parameters and the required grade of service (GoS).

The router dimensioning system 120 of the present invention is shown in FIG. 2. The system 120 preferably comprises a computation module 124 coupled to a user interface module 122 and a display module 128. The user interface module 122 and display module 128 may comprise a single computer, for example, a personal computer or work station having a keyboard and monitor and user interface software. The computation module 124 preferably comprises software that may be stored on a mainframe, portable diskette or hard drive, for example. The user interface module 122 is used to obtain input parameters of the network 100 from a network designer using the router dimensioning system 120. The computation module 124 comprises an algorithm 126 for performing calculations to determine the capacity required for the edge router 104 of the network 100 to adequately service the plurality of terminals 110. The display module 128 displays the output derived from the computation module, providing the network designer with the throughput capacity of the edge router 104 in terms of packets per second (pps).

A flow chart of the algorithm 126 utilized by the computation module 124 of the present invention is shown in FIG. 3. The input parameters of the data network 100, shown in Table 1, are input into the dimensioning system 120 user interface module 122 (step 142).

TABLE 1

Input Parameters

| Input parameters description | notation | Unit |
|---|---|---|
| Number of subscribers | S | / |
| The average number of file (e.g. web page) transfer requests per subscriber in the peak hour | M | Number of requests per subscriber per hour |
| Access Line Speed | A | Number of bits per second per request |
| Average File Size | F | Number of bytes |
| Average Packet Size | P | Number of bytes per packet |
| GoS (the Probability of Overloading | α | Percent |

Preferably, the input parameters include the number of subscribers (S), the average number of file transfer requests per subscriber in a peak time period, such as an hour (M), access line speed (A), average file size (F), average packet size (P), and the quality of service requirement, in terms of the probability of overloading (α), also known in the art as the grade of service (GoS), for example. Traffic patterns of Internet users have been studied and are understood in terms of on average, the number of web pages a user downloads or how many files a user will send. This traffic information is used to input the average number of file transfer requests per subscriber in a peak time period, M. The files may comprise an abstraction of a file, or alternatively, an e-mail or web-page, for example. Web-pages effectively comprise files that are downloaded to the subscriber. The average file size (F) characterizes the average size of a file in terms of bytes. The grade of service, GoS or α is typically expressed in terms of the percentage of time it is desired that a router is not overloaded, for example, a GoS of 5% represents that it is desired that 95% of the time the router should not be overloaded.

The output of the computation module 124 of the system 120 is the throughput capacity (C) of the edge router 104 in terms of packets per second (pps). The computing module 124 performs the calculations of the algorithm 126 using the input parameter values obtained from the user interface module 122. Notations for the intermediate variables are shown in Table 2.

TABLE 2

Intermediate Variables

| Variable Description | notation | Unit |
|---|---|---|
| Mean incoming rate of file (e.g. web page) transfer requests | λ | Number of file (web page) transfer requests per second |
| The mean duration for file (web page) transfer | T | Seconds |
| Number of file (web page) transfer requests in the time period, T | N | / |
| The upper bound of the number of "simultaneous" file (web page) transfer requests, such that the probability of the actual number of "simultaneous" requests exceeding this upper bound is less than the GoS, α | n | / |
| The router processing capacity in terms of number of packets per second | C | Packets Per Second (pps) |
| Average packet transfer rate per file (e.g. web page) transfer | R | pps/request |

The mean incoming rate of file transfer requests (λ) is calculated by multiplying the number of subscribers (S) by the average number of file transfer requests per subscriber in the peak time period (M) (step 144). The peak time period preferably comprises an hour but may comprise other time periods such as two consecutive hours, for example. The mean duration for file transfer T is calculated by dividing the average file size (F) by the access line speed (A) (step 146). Equation 1 is solved, for example, iteratively, to determine the smallest integer, n, such that Equation 1 is true, where n represents the upper bound of the simultaneous file transfer requests (step 148) before overloading the edge router 104.

$$\Sigma_{i=n+1} \ldots \infty (\lambda T)^i e^{\lambda T}/i! < \alpha \qquad \text{Equation 1}$$

Note that Equation 1 shown is based on a Poisson process: alternatively, a Erlang process or formula may be used for Equation 1. The average packet transfer rate per file or web page transfer (R) is calculated by dividing the access line speed (A) by the average packet, size (P) (step 150).

Finally, the edge router 104 processing capacity (C) in terms of the number of packets per second (pps) is calculated by multiplying the upper bound of the number of simultaneous file or web page transfer requests before overloading the edge router (n) by the average packet transfer rate per file (or web page) transfer (R) (step 154). The speed or capacity (C) calculated in accordance with the present invention provides the data network designer with an accurate parameter for dimensioning the edge router 104.

The present invention derives benefit from an assumption that the random process of the file or web page transfer requests is a Poisson process with parameter λ. This assumption is accurate and applicable because each terminal subscriber or user makes transfer requests independently of other subscriber transfer requests; therefore, a Poisson formula or table can be used. This is advantageous over prior art dimensioning models that assume the packet arrival process is a Poisson process.

To demonstrate the accuracy of this assumption, consider the case where a subscriber wants to view a web-page. The web-page transfer request submitted by the subscriber typically comprises not just one packet, but a stream of packets, sometimes referred to as a packet train, that is downloaded from a node in the IP backbone network 102 to the user's terminal 110. Thus, a file or web-page transfer request appears to the edge router 104 as independent bursts of packet trains. Therefore, the Poisson process can be applied, in accordance with the novel method of the present invention. In view of this assumption, $P[N=n]=(\lambda t)^n e^{-\lambda t}/n!$, $n=0,1,\ldots +\infty$, where N is the random variable representing the number of file (web page) transfer requests during the time period t, t is a time interval in terms of seconds, and $\lambda$ is the average rate of the transfer requests in terms of number of files (web pages) transfer requests per second.

Next, an example of an implementation of the present invention will be described. Table 3 shows an example of input parameter values.

TABLE 3

| Input | Example of input value |
|---|---|
| S | 15,000 |
| M | 3 requests/subscriber/peak hour |
| A | 10 Mbps (10 × 10$^6$ bits per second) per request |
| F | 120,000 bytes |
| P | 250 bytes/packet |
| α | 5% |

Table 4 shows each calculation step in accordance with algorithm 126.

TABLE 4

| Step | Calculations procedure | Example of calculations |
|---|---|---|
| 1. Calculate λ | λ = S*M/3600 | λ = 15,000*3/3600 = 12.5 requests/second |
| 2. Calculate T | T = F/A*8 | T = 120,000*8/ (10*1,000,000) = 0.1 seconds |
| 3. Calculate n | n is the smallest integer that satisfies: P[N > n] < α Here P[N > n] = $\Sigma_{i=n+1 \ldots \infty}(\lambda T)^i e^{-\lambda T}/i!$ | n can be found in a Poisson table. For the given λ, T, α = 5% in this example, n = 3 (simultaneous requests) |
| 4. Calculate R | R = A/P/8 | R = (10*1,000,000/ 8)/250 = 5000 pps/request |
| 5. Calculate C | C = n*R | C = 5000*3 = 15,000 pps |

Thus, in accordance with the present invention and the above input parameters, an edge router 104 having a 15,000 pps capacity is selected.

The novel algorithm 126, method and system 120, of the present invention achieves technical advantages by providing an accurate means of dimensioning an edge router 104 servicing subscribers at terminals 110 in a data network 100. The algorithm 126 utilizes calculations based on the number of subscriber requests in conjunction with a mathematical random table or calculation such as a Poisson or Erlang process. Under-dimensioning of the edge router 104 is avoided or prevented, resulting in fewer data traffic delays and retransmissions for the users of terminals 110 serviced by the router 104. The invention also prevents over-dimensioning of the edge router 104, resulting in cost savings, because higher capacity routers are more expensive than lower capacity routers. An appropriate edge router 104 is selectable for the particular data network parameters input that is cost effective and provides adequate service to meet the capacity requirements of users serviced by the router 104. Furthermore, an edge router 104 may be selected for the appropriate capacity in accordance with desired GoS requirements. The present invention provides an assessment of the performance and quality of service for a dimensioned router, not available with prior art models. Also, the invention is user-friendly and easily implemented based on network parameters input by the network designer.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, the mechanism described herein is preferably implemented in software, but may be implemented in hardware. Equation 1 may comprise a Poisson, Erlang or other random number table or process. Furthermore, the invention has been primarily described herein for use in a data network with digitized packets; however, the invention would also benefit other networks such as a digital; voice network, for example. Although dimensioning an edge router was primarily discussed herein, it is seen that the invention may be used to determine requirements and sizing of other access nodes in a communications network. It is therefore intended that the appended claims encompass any such modifications or embodiments.

What is claimed is:

1. A method of determining the throughput capacity of an access node adapted to service a plurality of terminals in a communications network, said access node being coupleable to an Internet Protocol (IP) network, said method comprising:

inputting network parameters, said network parameters including a number of subscribers using said terminals, an average number of data transfer requests per subscriber in a peak time period, access line speed of said terminals, average file size of said data transfer requests, average packet size of said data transfer requests, and a desired grade of service (GoS); and determining the required throughput capacity of said access node based on the number of terminal data transfer requests, wherein said determining step comprises:

calculating the mean incoming rate of data transfer requests;

calculating the mean duration for data transfer;

determining the upper bound of the number of simultaneous data transfer requests meeting said desired GoS;

calculating the average packet transfer rate per data transfer; and calculating the edge router throughput capacity.

2. The method according to claim 1 wherein said access node comprises an edge router.

3. The method according to claim 1 wherein said determining step is calculated using a Poisson process.

4. The method according to claim 1 wherein said determining stop is calculated using an Erlang process.

5. The method according to claim 1 wherein said terminal data transfer requests comprise digitized packet trains.

6. The method according to claim 1 wherein said simultaneous data transfer request upper bound is calculated using a Poisson process.

7. The method according to claim 1 wherein said simultaneous data transfer request upper bound is calculated using an Erlang process.

8. An apparatus for determining the throughput capacity of an access node adapted to service a plurality of terminals in a communications network, said access node being coupleable to an Internet Protocol (IP) network, comprising:

means for inputting network parameters, said network parameters including a number of subscribers using said terminals, an average number of data transfer requests per subscriber in a peak time period, access line speed of said terminals, average file size of said data transfer requests, average packet size of said data transfer requests, and a desired grade of service (GoS); and means for determining the required throughput capacity of said access node based on the number of terminal data transfer requests, wherein said determining step comprises means for:

calculating the mean incoming rate of data transfer requests;

calculating the mean duration for data transfer;

determining the upper bound of the number of simultaneous data transfer requests meeting said desired GoS;

calculating the average packet transfer rate per data transfer; and calculating the edge router throughput capacity.

9. The apparatus according to claim 8, wherein said access node comprises an edge router.

10. The apparatus according to claim 8, wherein said means for determining the upper bound of the number of simultaneous data transfer requests meeting said desired GoS utilizes a Poisson process.

11. The apparatus according to claim 8, wherein said means for determining the upper bound of the number of simultaneous data transfer requests meeting said desired GoS utilizes an Erlang process.

12. The method according to claim 8, wherein said terminal data transfer requests comprise digitized packet trains.

* * * * *